(12) United States Patent
Mohamadi

(10) Patent No.: US 11,095,043 B2
(45) Date of Patent: Aug. 17, 2021

(54) ELECTRONICALLY-CONTROLLED POLARIZATION OF ANTENNA ARRAYS

(71) Applicant: Farrokh Mohamadi, Irvine, CA (US)

(72) Inventor: Farrokh Mohamadi, Irvine, CA (US)

( * ) Notice: Subject to any disclaimer, the term of this patent is extended or adjusted under 35 U.S.C. 154(b) by 286 days.

(21) Appl. No.: 15/999,147

(22) Filed: Aug. 17, 2018

(65) Prior Publication Data
US 2019/0097327 A1 Mar. 28, 2019

Related U.S. Application Data

(60) Provisional application No. 62/551,574, filed on Aug. 29, 2017.

(51) Int. Cl.
*H01Q 7/00* (2006.01)
*H01Q 21/24* (2006.01)
*H01Q 21/00* (2006.01)
*G01S 7/02* (2006.01)
*G01S 13/02* (2006.01)
*H01Q 21/06* (2006.01)
*G01S 7/03* (2006.01)
*H01Q 1/48* (2006.01)
*H01Q 1/38* (2006.01)

(52) U.S. Cl.
CPC ............. *H01Q 21/24* (2013.01); *G01S 7/026* (2013.01); *G01S 7/032* (2013.01); *G01S 13/0209* (2013.01); *H01Q 1/38* (2013.01); *H01Q 1/48* (2013.01); *H01Q 7/00* (2013.01); *H01Q 21/0006* (2013.01); *H01Q 21/061* (2013.01); *H01Q 21/245* (2013.01)

(58) Field of Classification Search
CPC ........ H01Q 21/24; H01Q 21/48; H01Q 21/38; H01Q 21/245; H01Q 21/0006; G01S 7/032; G01S 7/026; G01S 13/0209
See application file for complete search history.

(56) References Cited

U.S. PATENT DOCUMENTS

| 6,714,169 | B1 * | 3/2004 | Chau | H01Q 23/00 343/876 |
| 2011/0018777 | A1 * | 1/2011 | Brown | H01Q 9/30 343/788 |
| 2015/0015453 | A1 * | 1/2015 | Puzella | H05K 1/0206 343/853 |
| 2018/0090851 | A1 * | 3/2018 | Feldman | H01Q 21/065 |

* cited by examiner

*Primary Examiner* — Awat M Salih
(74) *Attorney, Agent, or Firm* — Haynes and Boone, LLP

(57) ABSTRACT

A system and method is provided in which a single-pole-double-throw switch controls whether a circular loop transmits a right-hand circular polarized signal or a left-hand circular polarized signal. The single-pole-double-throw switch is shielded from the circular loop by a metallic ground plane. An annulus of dielectric insulates the circular loop from the metallic ground plane.

9 Claims, 8 Drawing Sheets

ELECTRONICALLY-CONTROLLED POLARIZATION OF ANTENNA ARRAYS

CROSS-REFERENCE TO RELATED APPLICATIONS

This application claims the benefit of U.S. Provisional Application No. 62/551,574, filed Aug. 29, 2017, the contents of which are hereby incorporated by reference in their entirety.

TECHNICAL FIELD

This application relates to antennas, and more particularly to an antenna array with electronically-controlled polarization.

BACKGROUND

The data rate for future 5G networks may be more than 10 Gbps, which is roughly 1000 faster than current 4G LTE network speeds. But achieving such fast data rates presents many challenges. For example, it is a fundamental principle of communication theory that information rate such as bits per second is proportional to the bandwidth of the transmission channel. There is only so much bandwidth in the 4G LTE frequency bands so to achieve greater data rates, the use of higher frequencies such as 38 GHz is proposed for 5G networks. But signal loss is considerably greater at these higher frequencies, which obfuscates the desired data rate since data rates are also limited by the signal-to-noise ratio (SNR) for the received signal.

One way to increase the SNR and thus boost the data rate is to increase the transmitter power. But Federal Communication Commission (FCC) and other regulating agencies limit the transmitter power for safety and for mitigation of electromagnetic interference. as there are health concerns with regard to RF exposure to the user as the transmitter power is increased. There is thus a limit to the transmitter power for handsets. Another way to boost the SNR is to use beam forming antenna arrays in the handset. The power for a beam forming antenna array has markedly greater power in the main beam and reduced sidelobe power as compared to the use of an analogous single antenna having isotropic propagation. But the directionality of a beam forming antenna array comes at the cost of narrowing the main beam such that a base station would more likely be located in the array's sidelobes. To achieve even better SNR despite a limited transmitter power, the antenna array may thus be configured for beam steering. The handset can then direct its main beam towards the base station (and vice versa) so that SNR is increased.

There is yet another way to increase SNR, which is through polarization diversity. In particular, it can be shown that the selective use of right-hand circular polarization (RHCP) or left-hand circular polarization (LHCP) provides a dramatic enhancement in SNR at the receiver, regardless of the polarization used by the transmitter. But the design of antenna arrays capable of transmitting or receiving selectively with RHCP and LHCP has proven to be problematic. Accordingly, there is a need in the art for antenna arrays with selective circular polarization.

SUMMARY

An antenna includes a circular loop that couples through vias in a metallic ground plane to a single-pole-double-throw (SPDT) switch. The circular loop is supported by an annulus of flexible (or rigid) dielectric (e.g., Kapton or RO4350) that lies between the circular loop and the ground plane. A pair of dielectric-insulated vias extend through the ground plane from the SPDT switch to the circular loop. A gap between the pair of vias defines a corresponding gap in the circular loop such that the circular loop is an open circular loop. The gap is configured to minimize coupling between the vias while preserving the circular polarization of the loop. Depending upon which throw is selected for by the SPDT switch, an RF signal from a feed network that couples to the SPDT switch is driven into a selected one of the vias so that both right-hand circular polarization (RHCP) and left-hand circular polarization (LHCP) may be selected for. The same selection also enables the antenna to receive with either RHCP or LHCP.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The following antenna array is described with regard to an embodiment for use in the Ka band. However, it will be appreciated that the principles disclosed herein for enabling selective polarization of an antenna array may be widely applied to virtually any suitable RF frequency. Accordingly, it will be understood that the following discussion will be directed to a Ka-band embodiment without loss of generality. The dimensions will also be expressed as a function of wavelength ($\lambda$) so that the principles disclosed herein may be applied to other RF frequencies.

Figure 1A:
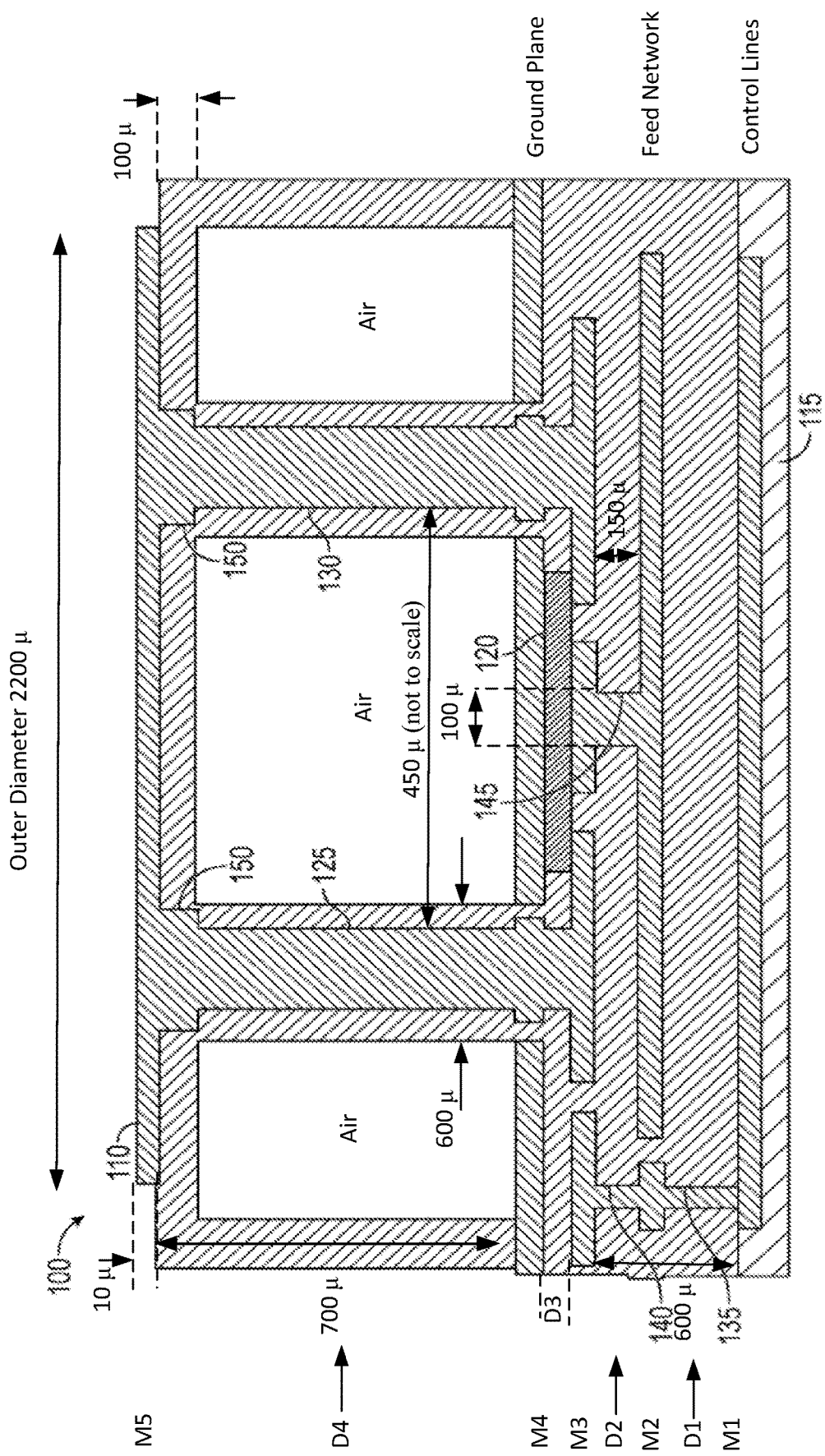
FIG. 1A is a cross-sectional view of a loop antenna having selective circular polarization in accordance with an aspect of the disclosure.

Turning now to the drawings, an antenna 100 is shown in a cross-sectional view in FIG. 1A. Antenna 100 is constructed using a number of metal layers formed over a substrate such as a flexible substrate 115 (e.g., Kapton or RO4350). A first metal layer M1 forms a lead for a control signal that controls whether antenna 100 functions with RHCP or LHCP. A second metal layer M2 forms the feed network and thus includes a lead for the RF signal (either for transmitting or receiving). A third metal layer M3 includes leads for the RF signal and also for the control signal to be coupled to the polarization control switch discussed further below. A fourth metal layer M4 forms a universal ground plane for shielding antenna 100 from the control signal and RF feeds in the lower metal layers. Finally, a fifth metal layer M5 forms the radiating element for antenna 100, which is an open circular coil 110 but which may deviate from a circular shape in alternative embodiments. The outer diameter of the annulus formed by circular loop or coil 110 may be 2200µ (30% λ) whereas its inner diameter may be 1600µ (21.8% λ). The width of the metal lead forming circular loop 110 is thus 300µ (4% λ) whereas its thickness is 10µ. The other metal layers M1 through M4 may also be 10µ in thickness.

A single-pole double-throw (SPDT) switch 120 functions as the polarization control switch to control the selection of RHCP or LHCP for antenna 100 responsive to the control signal. Should the control signal select for RHCP, SPDT switch 120 selects for a via 125 that extends between the M4 and M5 metal layers to drive with the RF signal (or to receive the RF signal). Conversely, SPDT switch 120 selects for a via 130 that also extends between the M4 and M5 metal layers if the control signal commands for LHCP operation. The spacing between vias 125 and 130 is configured so that the transmitted signal radiates away from antenna 100 as opposed to coupling back into the return via. For example, if the RF signal is driven into via 125, RF energy should not couple back through via 130 in any appreciable fashion. If vias 125 and 130 are too close, the coupling between the two vias would become too high. Conversely, the circular polarization (whether RHCP or LHCP) would degrade if vias 125 and 130 are spaced too far apart. For the Ka band, a spacing of 450µ (6% λ) results in advantageous polarization for antenna 100 and decoupling between vias 125 and 130. It will be appreciated that this via spacing is not shown to scale in FIG. 1A for illustration clarity.

The dielectric between the various metal layers may comprise the same flexible dielectric. For example, a dielectric layer D1 insulates metal layers M1 and M2 from each other. To reduce the coupling between these metal layers, dielectric layer D1 may have a thickness of 440µ (6% λ). The spacing between metal layers M2 and M3 may be thinner such that a dielectric layer D2 that insulates metal layers M2 and M3 from each other may have a thickness of 150µ (2% λ). There is thus a separation of 600µ (8% λ) between metal layers M3 and M1 in such an embodiment. A via 135 couples from metal layer M1 to metal layer M3 to carry the control signal. Similarly, a via 140 couples from metal layer M2 to metal layer M3 to propagate the control signal. Another via 145 couples from metal layer M2 to metal layer M3 to carry the RF signal for transmission to SPDT switch 120. Via 145 may have a width of 100µ (1.3% λ) to provide a sufficiently low impedance to the RF signal. A dielectric layer D3 having a thickness of 100µ (133% λ) separates metal layer M3 from metal layer M4 (the ground plane). A dielectric layer D4 having a thickness of 700µ (9.3% λ) insulates metal layer M5 from metal layer M4. Vias 125 and 130 may each have a thickness of 300µ (4% λ). To assist the coupling to circular loop 110, vias 125 and 130 may each end in a cap 150 that is wider than the 300µ thickness. Each cap 150 may be 100µ (1.3% λ) thick.

Figure 1B:
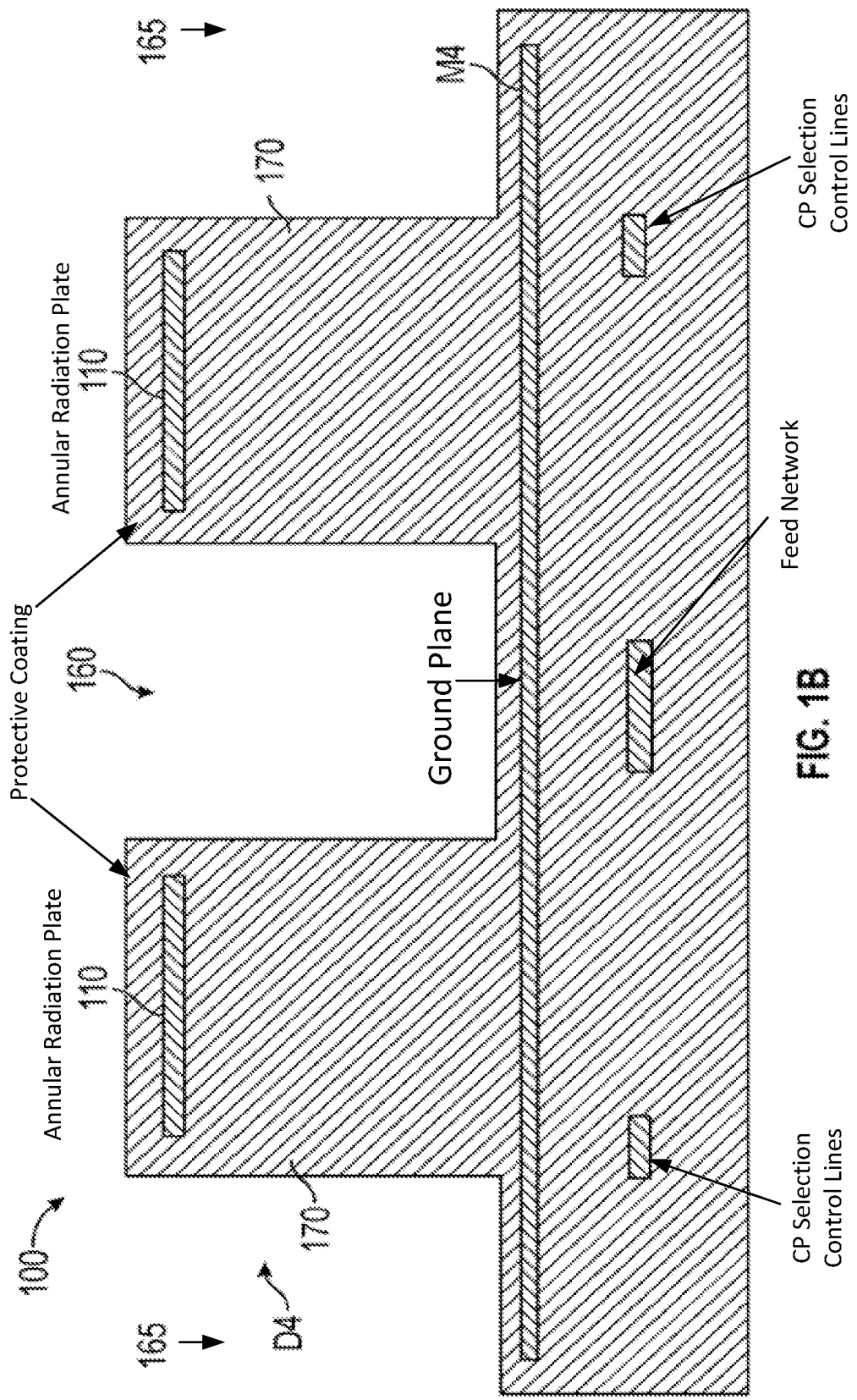
FIG. 1B is another cross-sectional view of the loop antenna of FIG. 1A.

Antenna 100 is shown to scale in the cross-sectional view of FIG. 1B. For illustration clarity, the various vias are not shown in FIG. 1B. In addition, metal layers M1 through M3 are shown as a single metal layer supporting the RF feed network and CP control lines for illustration clarity. Dielectric layer D4 forms an annulus that supports circular loop 110. There is thus a "donut hole" of air 160 in the dielectric annulus, extending from loop 110 down to a thin dielectric coating on metal layer 4 (the ground plane). Similarly, an outer annulus 165 of air having the same thickness insulates antenna 100 from other antennas. The resulting insulation with air is quite advantageous in reducing coupling of antenna 100 to other antennas. Note that SPDT 120 may be modified to include a power amplifier and a phase shifter for beam steering applications. In an alternative embodiment, the phase shifter and power amplifier may be implemented in a separate integrated circuit coupled to the feed network on the M2 metal layer. Antenna array 105 may be advantageously implemented in a system such as described in U.S. Pat. Nos. 9,244,163 and 9,748,645, the contents of both of which are here incorporated by reference in their entirety.

Figure 2:
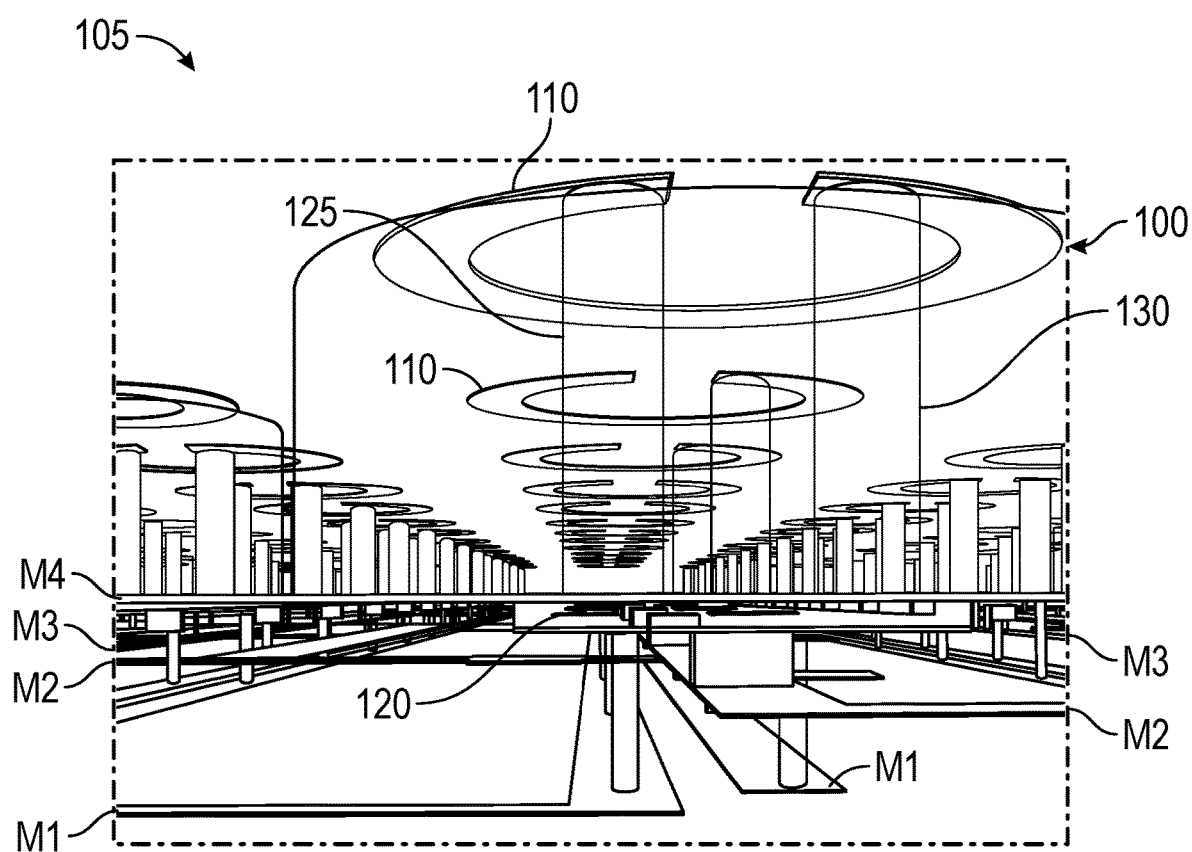
FIG. 2 is a perspective view of an antenna array in which each antenna is constructed as disclosed with regard to FIGS. 1A and 1B.
Figure 3:
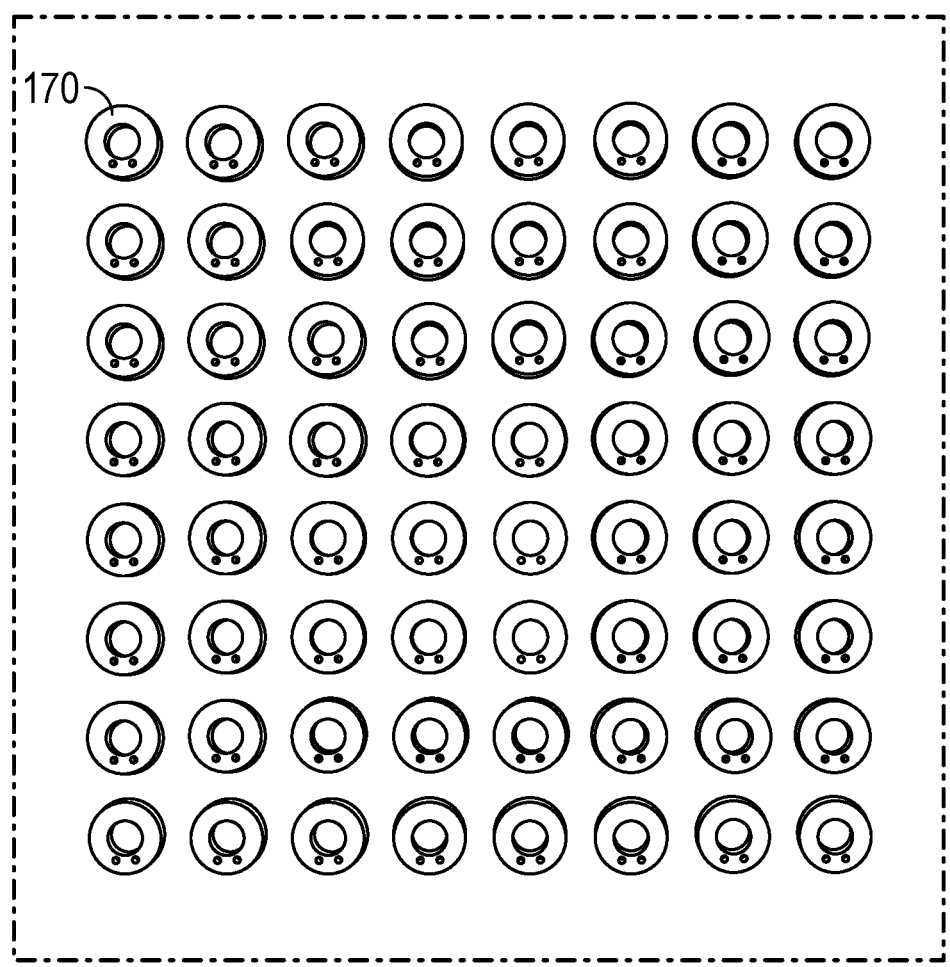
FIG. 3 is a plan view of the flexible dielectric selecting surrounding each circular loop in the antenna array of FIG. 2.

Antenna 100 may be arranged into an array 105 of similar antennas as shown in the perspective view of FIG. 2. For illustration clarity, the dielectric layers D1 through D3 are not shown in FIG. 2. Array 105 is shown in plan view in FIG. 3. Each antenna is supported by its own annulus of dielectric 170. It will be appreciated that the array size for array 105 may be any suitable size such as 4×4, 8×8, or the illustrated size of 16×16.

Figure 4A:
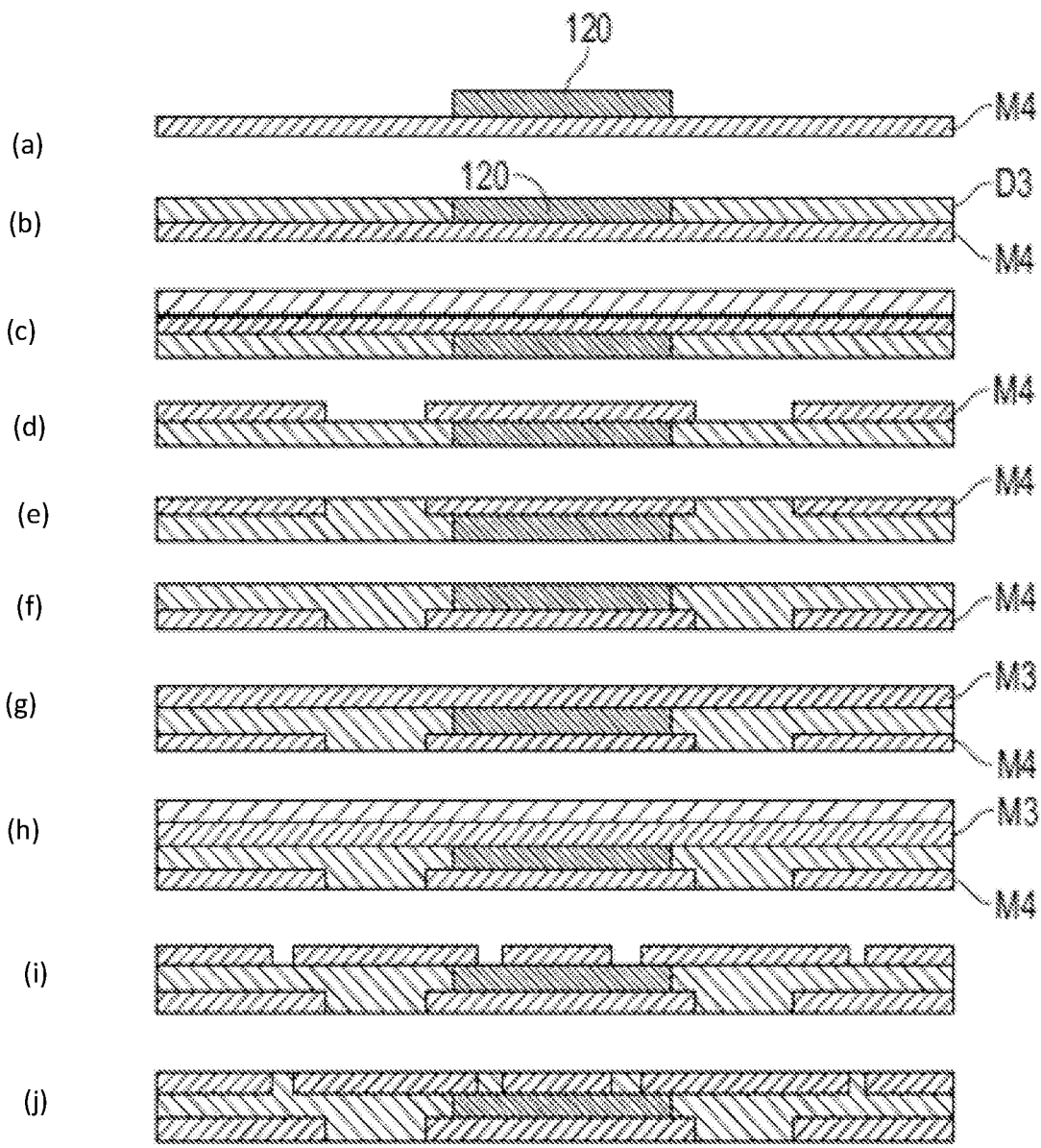
FIG. 4A illustrates some initial steps in the manufacture of the array of FIG. 2 in accordance with an aspect of the disclosure.
Figure 4B:
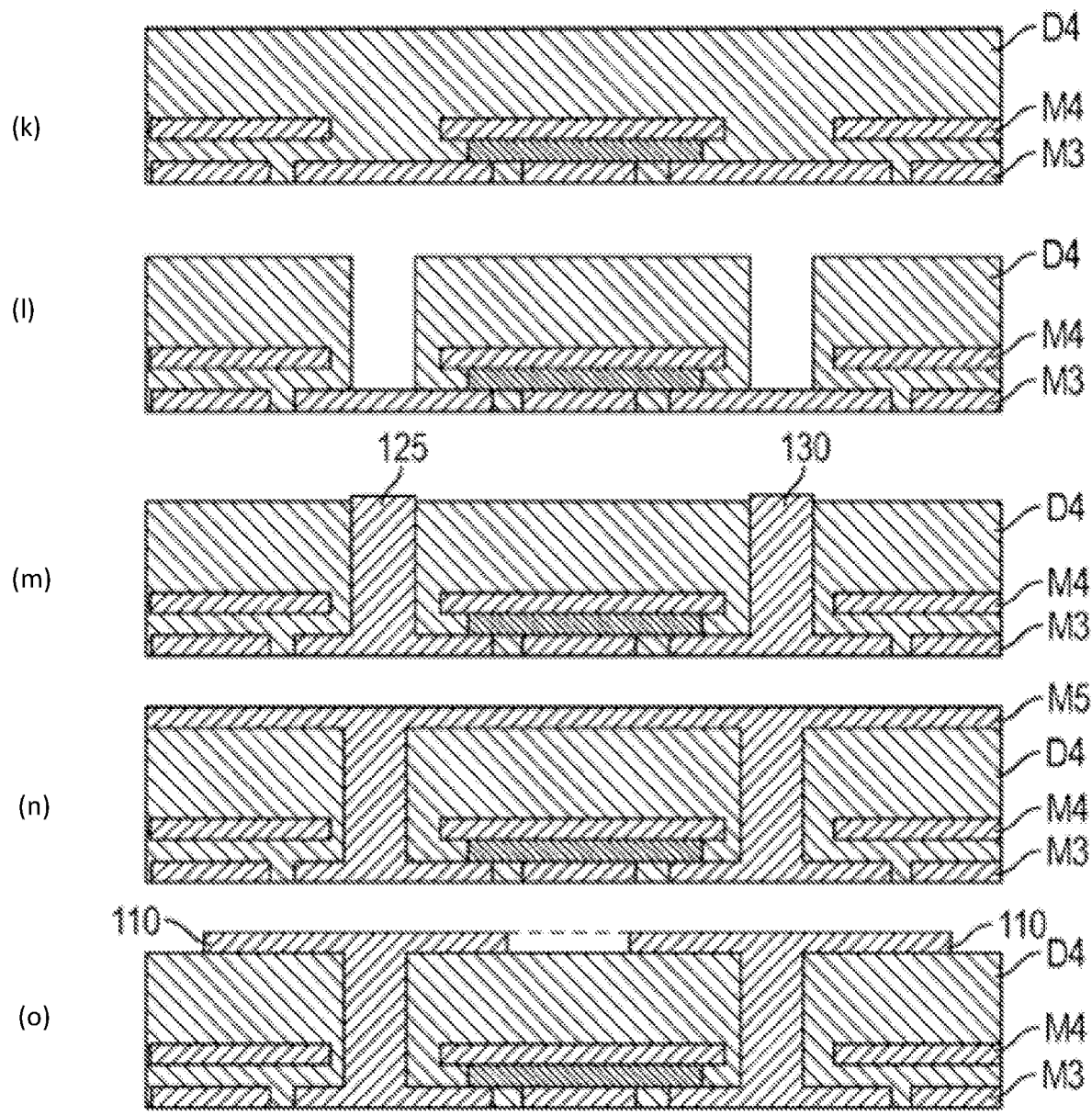
FIG. 4B illustrates the final steps of manufacture for the manufacturing process of FIG. 4A.

A method of manufacture for antenna 100 (or array 105) will now be discussed with reference to FIG. 4A and FIG. 4B. The method begins with a step (a) of depositing the ground layer (metal layer M4) on top of a temporary substrate (the temporary substrate is now shown for illustration clarity). For example, metal layer M4 may comprise copper. SPDT 120 is attached using silver epoxy or another suitable highly conductive paste, which is then cured. The height of SPDT 120 defines the depth of dielectric layer D3, which is deposited in a step (b). For example, a thin layer of Kapton may be attached to form dielectric layer D3. A thin film of adhesive may be used to secure the Kapton to the ground layer. In a step (c), a layer of photoresist is deposited on the antenna-facing side of metal layer M4 so that the openings for vias 125 and 130 may be formed in a step (d). In this fashion, the ground plane (metal layer M4) will advantageously function to insulate the antennas from the RF feed network, the polarization control signals, and the associated switching in SPDT 120.

The openings for the vias are then filled with dielectric (e.g, Kapton) in a step (e) whereupon the assembly is flipped and mounted onto another temporary substrate (not illustrated) such as FR4 in a step (f). Metal layer M3 may then be deposited in a step (g). For example, copper may be deposited on top of a thin adhesive layer. Another layer of photoresist is then applied to what will be the substrate-facing side of metal layer M3 in a step (h) so that the feed network leads and control line leads may be formed in metal layer M3 in a step (i). The D2 layer of Kapton may then be attached in a step (j). Like the other flexible dielectric layering, the Kapton layer is then cured at the appropriate temperature (e.g., below 200° C.).

The assembly is then flipped again and mounted to another temporary substrate (not illustrated) so that dielectric layer D4 may be deposited (e.g, Kapton) as shown in step (k). Voids for the vias 125 and 130 are then formed in a step (l) through dielectric layer D4. For example, a laser may be used to laser drill the voids through dielectric layer D4. Laser drilling may also be used to form annulus 170 (FIG. 3) in dielectric D4. Vias 125 and 130 are then metallically deposited in a step (m). Metal layer M5 is then deposited in a step (n) and patterned in a step (o) to form circular loop 110. It will be appreciated that the deposition and patterning of metal layers M1 and M2 and corresponding dielectric layers D1 and D2 may be performed in an analogous fashion. These layers are not shown in FIG. 4B for illustration clarity.

Figure 5:
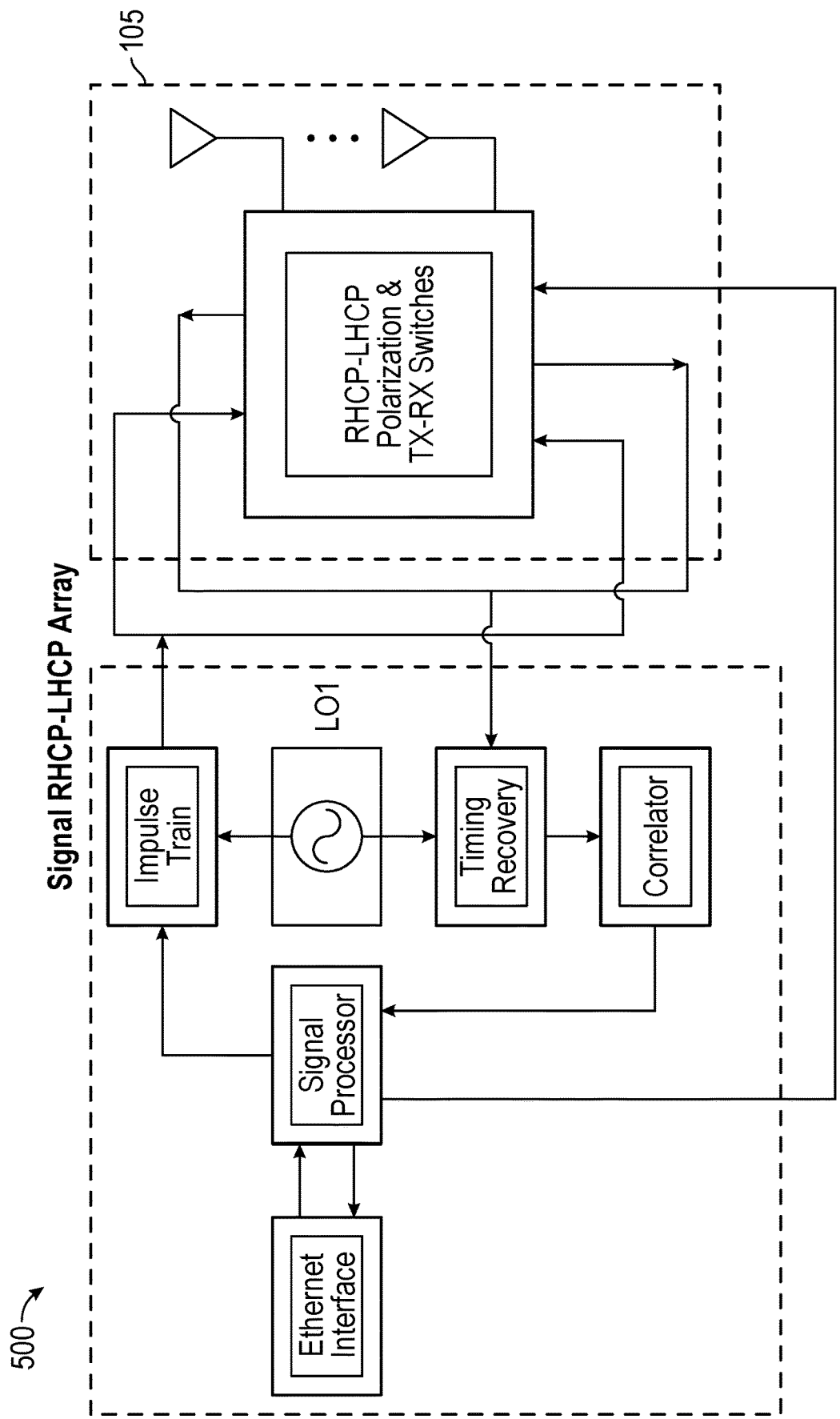
FIG. 5 illustrates an ultra-wideband radar incorporating an array of antennas constructed in accordance with an aspect of the disclosure.
Figure 6:
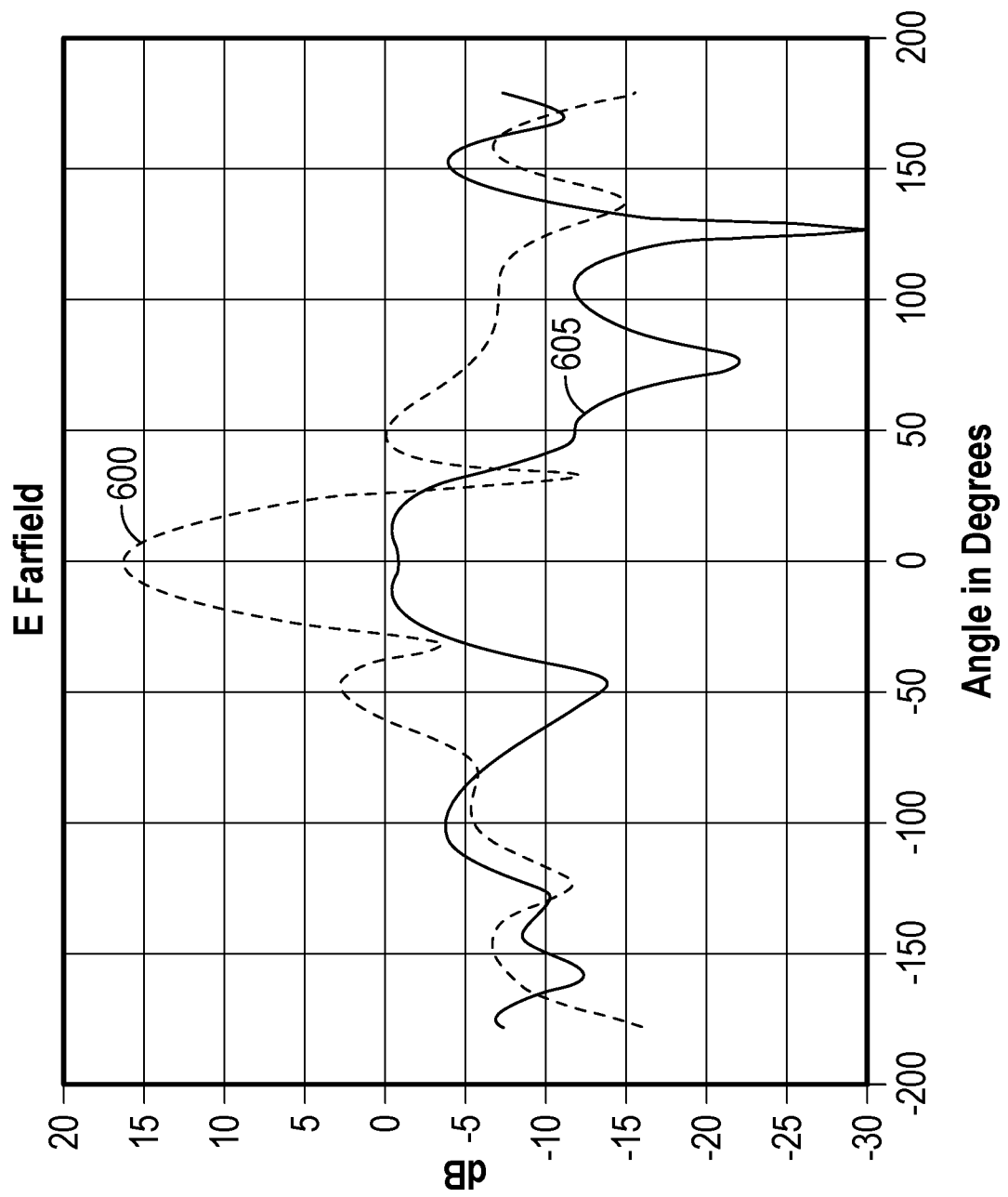
FIG. 6 illustrates the cross-polarization far-field pattern for an 8×8 Ka band array in accordance with an aspect of the disclosure.

Array 105 may be advantageously employed in multiple applications, including smartphones, radar, and satellite communications. An example monostatic ultra-wideband (UWB) radar 500 that includes array 105 is shown in FIG. 5. The cross-polarization ability of radar 500 to transmit pulses with RHCP and receive reflected pulses in LHCP (or vice versa) provides significant remote sensing improvements. For example, the far-field radiation pattern for a RHCP transmission 600 is shown in FIG. 6 from an 8×8 antenna array operating in the Ka band. The pulse bandwidth of approximately 9 GHz covers the range of 36 to 47 GHz with a beam width of about 8 degrees. The cross-polarization suppression of an LHCP far-field radiation 605 is approximately 20 dB.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. An antenna comprising:
   a single-pole-double-throw (SPDT) switch;
   a metallic ground plane having a pair of apertures;
   an annulus of dielectric on the metallic ground plane;
   a conductive loop on the annulus of dielectric;
   a pair of vias configured to couple from the SPDT switch through the pair of apertures in the metallic ground plane to the conductive loop, wherein the SPDT switch is configured to select for either via in the pair of vias responsive to a polarization control signal and to drive a first RF signal into the selected one of the vias during a transmission mode of operation;
   a substrate;
   a first metal layer on the substrate, the first metal layer being patterned into a lead for the polarization control signal;
   a second metal layer, the second metal layer being patterned into a lead for the first RE signal; and
   a first dielectric layer separating the first metal layer from the second metal laver.

2. The antenna of claim 1, wherein the SPDT switch is further configured to receive a second RE signal from the selected one of the vias during a receive mode of operation.

3. The antenna of claim 1, wherein the annulus of dielectric comprises a flexible dielectric.

4. The antenna of claim 1, wherein the antenna is integrated into an array of antennae each having a conductive loop supported by a corresponding annulus of dielectric.

5. The antenna of claim 4, wherein each annulus is surrounded with a ring of air.

6. The antenna of claim 4, wherein the array of antennas is integrated into an ultra-wideband radar.

7. The antenna of claim 4, wherein the array of antennas is integrated into a mobile device.

8. The antenna of claim 1, wherein the SPDT switch also comprises a power amplifier and a phase shifter.

9. The antenna of claim 1, further comprising:
   a third metal layer patterned into leads coupled to the pair of vias;
   a second dielectric layer separating the third metal layer from the second metal layer, wherein the SPDT switch is electrically coupled to the leads in the third metal layer; and
   a third dielectric layer separating the third metal layer from the metallic ground plane.

* * * * *

UNITED STATES PATENT AND TRADEMARK OFFICE
CERTIFICATE OF CORRECTION

| | | |
|---|---|---|
| PATENT NO. | : 11,095,043 B2 | |
| APPLICATION NO. | : 15/999147 | |
| DATED | : August 17, 2021 | |
| INVENTOR(S) | : Farrokh Mohamadi | |

It is certified that error appears in the above-identified patent and that said Letters Patent is hereby corrected as shown below:

In the Claims

In Claim 1, Column 6, Line 9, change "RE" to --RF--

In Claim 1, Column 6, Line 11, change "laver" to --layer--

In Claim 2, Column 6, Line 13, change "RE" to --RF--

Signed and Sealed this
Fifth Day of July, 2022

Katherine Kelly Vidal
*Director of the United States Patent and Trademark Office*